US008588731B2

(12) United States Patent  
Gouvia et al.

(10) Patent No.: US 8,588,731 B2  
(45) Date of Patent: Nov. 19, 2013

(54) TYY INTERFACE MODULE SIGNAL TO COMMUNICATE EQUIPMENT DISRUPTION TO CALL CENTER

(75) Inventors: Jacquelyn A. Gouvia, Royal Oak, MI (US); Travis L. Bradburn, Ortonville, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/181,190

(22) Filed: Jul. 12, 2011

(65) Prior Publication Data

US 2013/0017800 A1 Jan. 17, 2013

(51) Int. Cl.  
*H04M 11/04* (2006.01)

(52) U.S. Cl.  
USPC ........................................... 455/404.1

(58) Field of Classification Search  
USPC ............. 455/99, 404, 466, 404.2, 456.1, 557, 455/569.2, 517; 379/45, 93.23, 52, 123; 340/539.11; 714/786; 370/305  
See application file for complete search history.

(56) References Cited

U.S. PATENT DOCUMENTS

| 7,323,973 | B1 * | 1/2008 | Ceglia et al. ................. 340/436 |
| 2006/0025085 | A1 * | 2/2006 | Van Bosch et al. ............. 455/99 |
| 2009/0186596 | A1 * | 7/2009 | Kaltsukis .................. 455/404.2 |
| 2009/0193320 | A1 * | 7/2009 | Furbeck ....................... 714/786 |

* cited by examiner

*Primary Examiner* — Kiet Doan  
(74) *Attorney, Agent, or Firm* — Leydig, Voit & Mayer, Ltd.

(57) ABSTRACT

The described method and system provide for determining whether to immediately contact a PSAP (Public Safety Answering Point) or attempt to communicate with a telematics services subscriber before contacting the PSAP in the event of an emergency. If a subscriber associated with the telematics unit is deaf and/or mute, and a TIM (TTY (TeleTYpewriter) Interface Module) or TTY device is not available to the subscriber, the subscriber may not be able to communicate with a call center regarding an emergency situation. Thus, expedited emergency procedures are executed by the call center in such a situation to avoid delay and facilitate the arrival of assistance as soon as possible.

7 Claims, 4 Drawing Sheets

TYY INTERFACE MODULE SIGNAL TO COMMUNICATE EQUIPMENT DISRUPTION TO CALL CENTER

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Many telematics services are dependent on voice communications between a user of the telematics unit and an operator at a TSP call center. In order to accommodate disabled individuals who may be unable to hear or speak, or have difficulty hearing or speaking, a TSP may offer telematics services through a TTY (TeleTYpewriter) device, also known as a TDD (Telecommunications Device for the Deaf). The TTY device may connect to the telematics unit through a TIM (TTY Interface Module), allowing a person who is deaf and/or mute to utilize telematics services.

However, a TIM or a TTY device may not be installed on all vehicles, may be installed improperly, or may malfunction. The user may also simply forget to connect the TTY device to the TIM or to plug in the TTY device to a power source. Moreover, in certain situations, such as upon impact during an accident or airbag deployment, the TIM or TTY device may become disconnected, damaged, or inoperable. Thus, it is an object in part to provide a system and method for determining whether a deaf and/or mute subscriber has communication capabilities in the event of an emergency. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for determining whether to immediately contact a PSAP (Public Safety Answering Point) or attempt to communicate with a telematics services subscriber before contacting the PSAP in the event of an emergency. The method comprises: determining, at a telematics unit, that an emergency has occurred; determining if a subscriber associated with the telematics unit is at least one of deaf and mute; and transmitting an indication of whether expedited emergency procedures are to be used to a call center based on the determination of whether the subscriber is at least one of deaf and mute. The determination that an emergency has occurred may be based on the telematics unit receiving an input from the subscriber indicating that an emergency has occurred; receiving information that the vehicle was in an accident; or receiving information that the vehicle airbag was deployed.

In one implementation, the telematics unit transmits an indication that expedited emergency procedures are to be used if the subscriber is determined to be at least one of deaf and mute. In another implementation, the telematics unit further determines whether a TIM (TTY (TeleTYpewriter) Interface Module) is operational and whether a TTY device is operational, and decides whether expedited emergency procedures are to be used based on that determination. In this implementation, the telematics unit transmits an indication that expedited emergency procedures are to be used if the subscriber is at least one of deaf and mute and at least one of the TIM and the Try device are determined to be not operational.

In a further implementation, if the telematics unit determines that the subscriber is not deaf and/or mute, the telematics unit may transmit an indication that normal emergency procedures are to be used. In yet another further implementation, if the telematics unit determines that both the TIM and the TTY device are operational, the telematics unit may also transmit an indication that normal emergency procedures are to be used.

The call center receives a notification that an emergency has been detected by a telematics unit; determines whether a condition for expedited emergency procedures has been met; and contacts a PSAP immediately if a condition for expedited emergency procedures is determined to have been met (e.g. before attempting to communicate with the subscriber). In one implementation, the determination of whether the condition has been met may be based on receiving an indication from the telematics unit that expedited emergency procedures are to be used. In another implementation, the determination of whether the condition has been met may be based on receiving an indication from the telematics unit that the TIM or TTY device is not operational.

If the condition is determined not to have been met, the call center may communicate (through vocal communications or through the TTY device) with a subscriber in the vehicle and determine whether a PSAP is to be contacted based on the communications.

The inventive principles described herein may also be implemented as computer executable instructions on a tangible, non-transient computer-readable medium at a telematics unit or call center.

Other objects and advantages of the invention will become apparent upon reading the following detailed description and upon reference to the drawings.

DETAILED DESCRIPTION OF THE INVENTION

Figure 1:
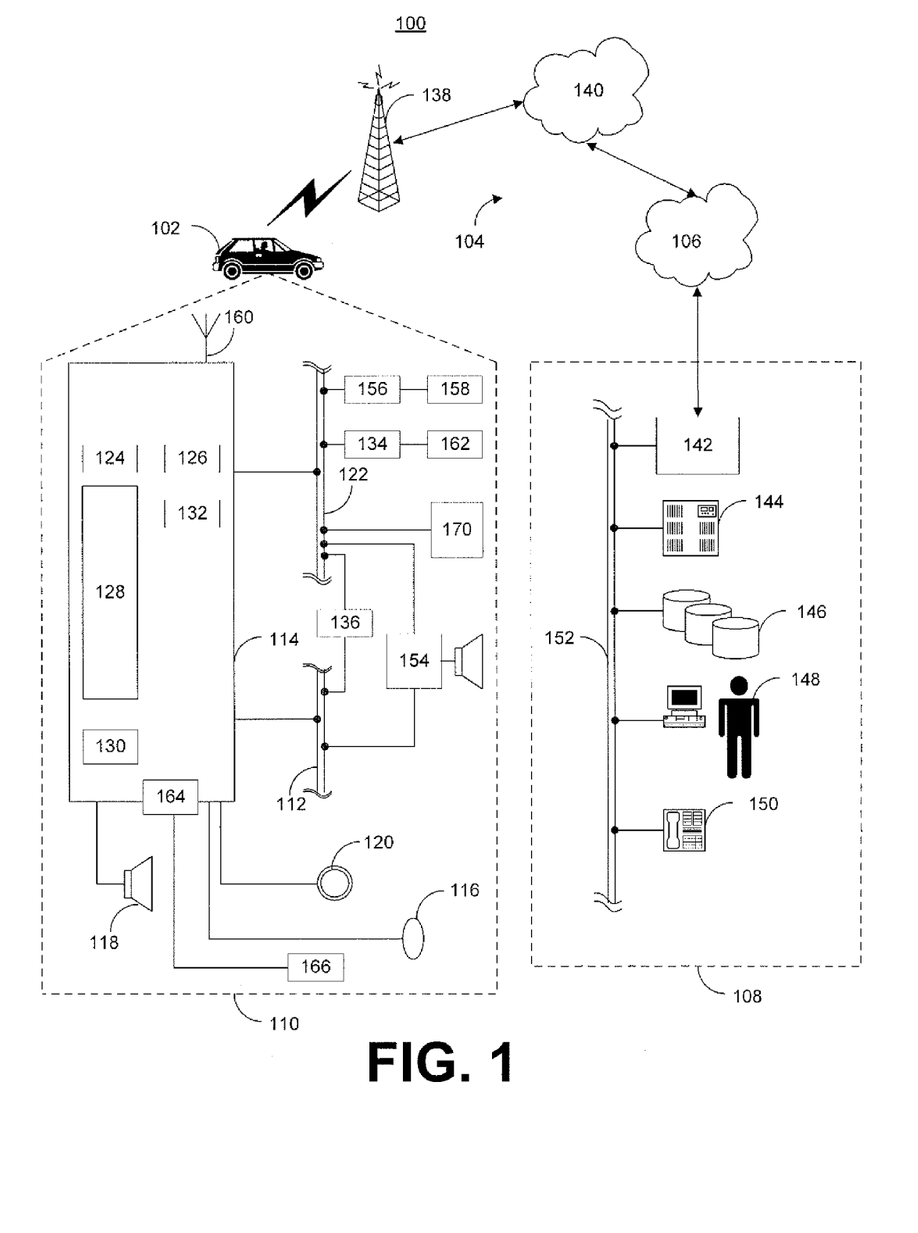
FIG. 1 is a schematic diagram of an operating environment for a mobile vehicle communication system usable in implementations of the described principles.

Before discussing the details of the invention and the environment wherein the invention may be used, a brief overview is given to guide the reader. In general terms, not intended to limit the claims, the invention is directed to a system and method for determining whether to immediately contact a PSAP or attempt to communicate with a subscriber before contacting the PSAP in the event of a detected emergency. Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114. The navigation unit 132 may utilize a vehicle display 170 to display messages or graphics to the user, and may receive inputs through the vehicle display 170 (in implementations where the display is a touch screen) or through vehicle buttons 120. In other implementations, the navigation unit 132 may have its own display and input buttons associated with it (not depicted).

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

The telematics unit 114 may further provide TTY services by utilizing a TTY device 166 connected to the telematics unit 114 through a TIM 164. It will be appreciated that the TTY device 166 may be any type of TTY device known in the art, such as TTY devices produced by Ultratec, including but not limited to TTY devices with functionality such as transcribing incoming voice communications to text, allowing user input on a full keyboard, and transmitting communications in either data mode or voice mode. The TIM may determine whether the TTY device is operating in data mode or voice mode and communicate with the telematics unit such that the TTY device is able to communicate over wireless carrier system 104 through the telematics unit 114. It will further be appreciated that the TIM may be a component inside the telematics unit 114 or may be connected to the telematics unit 114 through an appropriate interface.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112. A display component 170 may further be connected to the vehicle bus and integrated into the vehicle dashboard, or located elsewhere within the vehicle, for displaying information related to various telematics services and for providing a graphical user interface. In a further implementation, the display may be a touch-screen display allowing input through the display as an alternative to buttons or controls 120. In alternative implementations, the display 170 may be connected directly to the telematics unit or may be included as part of the telematics unit.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few. Additionally, the vehicle sensors 162, the navigation unit 132, or the TIM 164 may include a sensor for detecting whether or not the TTY device 166 is attached and determining whether the TTY device 166 has become dislodged, for example, in the event of an accident or airbag deployment.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
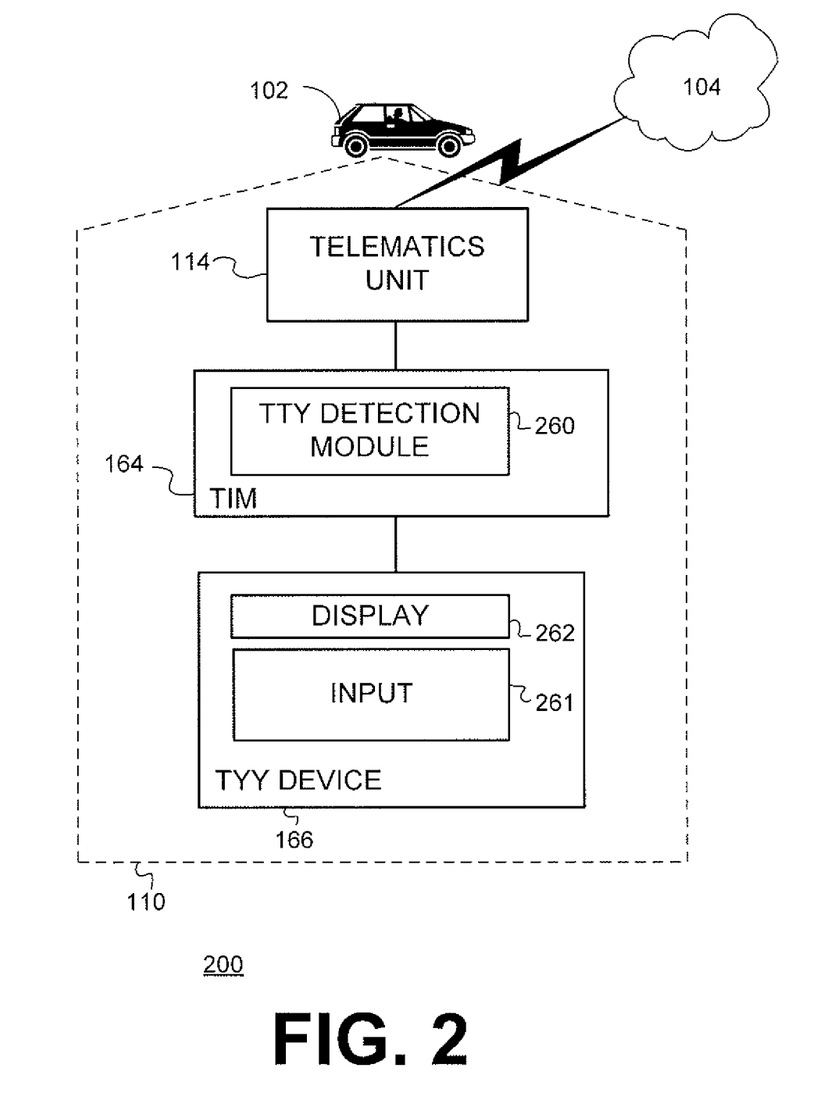
FIG. 2 is a schematic diagram showing relevant communication links between components within the vehicle in accordance with an implementation of the described principles.

FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 102 includes vehicle hardware 110 comprising a telematics unit 114, a TIM 164, and a TTY device 132 in communication with each other. It will be appreciated that the TIM 164 may be installed as part of the telematics unit 114 or external to and connected to the telematics unit 114. It will further be appreciated that the telematics unit 114, TIM 164, and TTY device 166 may all include tangible non-transient computer-readable media as storage for instructions and applications, as well as processors for executing those instructions and applications. It will be appreciated that the instructions and applications corresponding to their functions as described below may be implemented on any one of, or on multiple components of, the vehicle hardware 110.

The TIM 164 may further comprise a TTY detection module 260, configured to determine whether the TTY device 166 is connected to the TIM 164 and whether the TTY device 166 is operational. The telematics unit 114 may also be configured to determine whether a TIM 164 is installed. The TTY device 166 further comprises a display 262 (e.g. a screen for displaying incoming communications to a user) and input 261 (e.g. a keyboard for typing in a message). It will further be appreciated that the input 261 may include a microphone such that a user of the TTY device 166 may transmit messages in voice format (through the microphone) or in a data or text format (through the keyboard). The TIM 164 may then determine whether the TTY device 166 is in data mode or voice mode, and the outgoing message may be processed by the TIM 164, the telematics unit 114, or a call center receiving the message over wireless network 104 accordingly.

Figure 3:
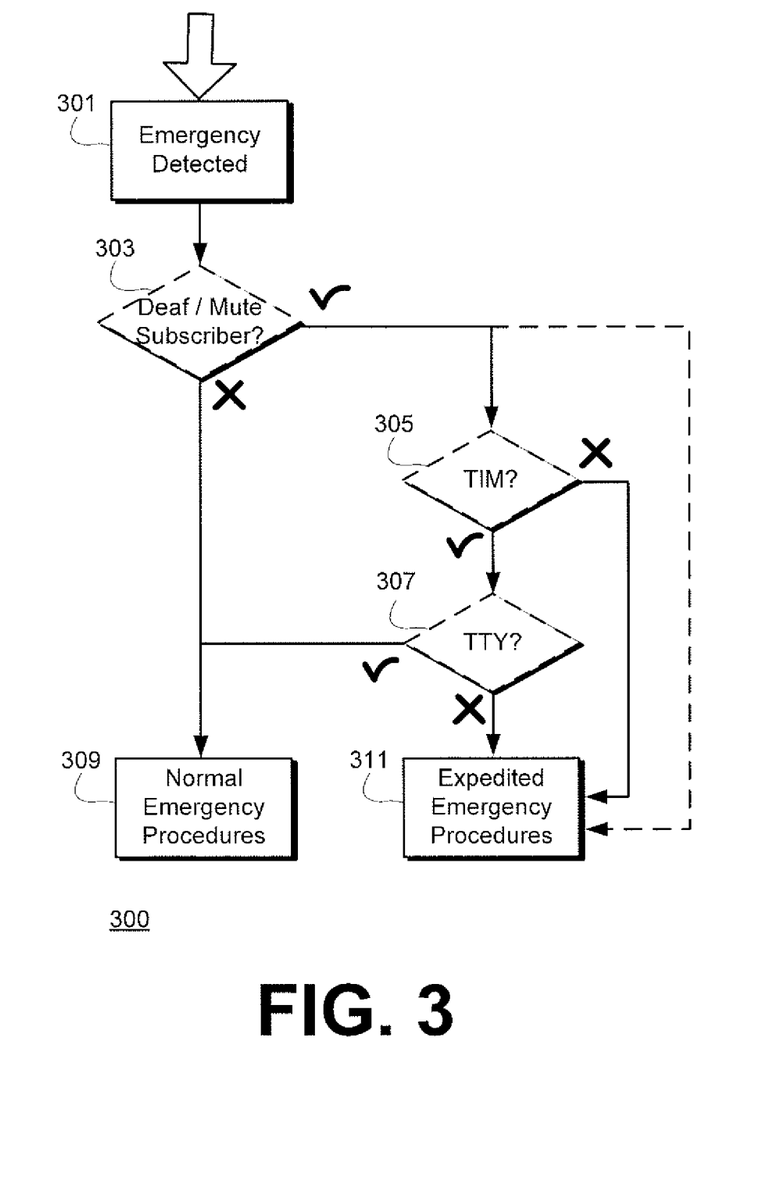
FIG. 3 is a flowchart illustrating a process for determining whether to immediately contact a PSAP or attempt to communicate with a subscriber before contacting the PSAP in the event of a detected emergency at the telematics unit in accordance with an implementation of the described principles.

With further reference to the architecture of FIGS. 1 and 2, and turning more specifically to FIG. 3, an exemplary process 300 is depicted for determining whether to immediately contact a PSAP or attempt to communicate with a subscriber before contacting the PSAP in the event of a detected emergency. First, an emergency is detected by the telematics unit 301. The emergency may be detected through user input (e.g. the subscriber hits an emergency button), through the telematics unit determining that the airbag(s) deployed, through feedback to the telematics unit from vehicle sensors (e.g.

collision sensors), or any other suitable means. It will be appreciated that the detection of an "emergency," as the term is used here, may or may not correspond to an actual emergency situation but merely means that an event that may be likely to correspond to an actual emergency was detected.

In one implementation, if the subscriber associated with the vehicle for which the emergency is detected is known to be deaf and/or mute 303, the telematics unit may immediately determine that expedited emergency procedures are necessary 311 without checking whether the TIM or TTY device are operational (indicated by the dashed line/arrow in FIG. 3). In another implementation, if the subscriber associated with the vehicle for which the emergency is detected is known to be deaf and/or mute 303, the telematics unit may determine that expedited emergency procedures should be used 311 when the TIM is not installed or not operational 305, or when the TTY device is not connected or not operational 307. In this implementation, if both the TIM and TTY device are determined to be working properly, normal emergency procedures may be used (e.g. the call center may first attempt to communicate with the subscriber through the TTY device). It will be appreciated that if the subscriber is not deaf and/or mute 303, the telematics unit may determine that normal procedures may be used.

It will be appreciated that the determination of whether a subscriber is known to be deaf and/or mute may be carried out after the emergency is detected 301 (as depicted by FIG. 3) or it may be previously programmed into the telematics unit such that, when an emergency is detected, the telematics unit immediately behaves according to expedited emergency procedures 311 in one implementation or immediately checks whether the TIM and TTY device are operational 305 and 307 in another implementation. It will further be appreciated that the steps depicted in FIG. 3 may occur in different orders than what is depicted. For example, a telematics unit may first check whether a TIM is installed and operational 305, and if it determines that a TIM is installed and operational 305, there may be no reason to separately determine whether the subscriber is deaf and/or mute 303. If it determines that no TIM is installed, it may then check whether the subscriber is known to be deaf and/or mute 303. It will further be appreciated that information regarding whether a subscriber is deaf and/or mute may be stored at the telematics unit or at the call center.

At the conclusion of the process 300 depicted by FIG. 3, the telematics unit has determined whether normal emergency procedures 309 should be used or if expedited emergency procedures should be used 311. The telematics unit may then transmit this information to a call center to facilitate the notification of a PSAP if necessary.

Figure 4:
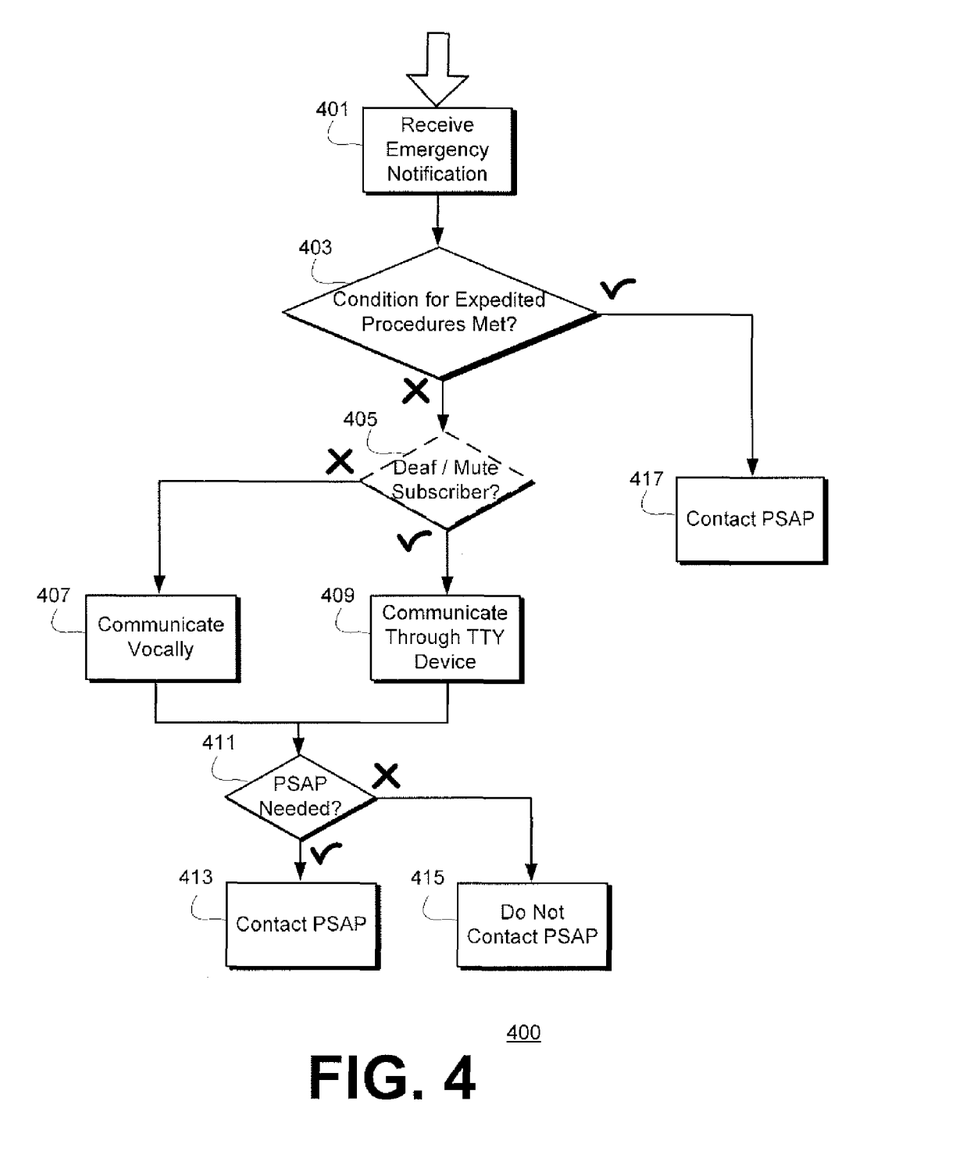
FIG. 4 is a flowchart illustrating a process for determining whether or not to contact a PSAP in the event of a detected emergency at a call center in accordance with an implementation of the described principles.

With further reference to the architecture of FIGS. 1 and 2 and the process of FIG. 3, and turning more specifically to FIG. 4, an exemplary process 400 is depicted for determining, at the call center, whether or not to contact a PSAP in the event of a detected emergency. The call center first receives a notification from the telematics unit that an emergency has been detected 401, and determines whether the condition for expedited procedures has been met 403. This determination 403 may be based on a received transmittal by a telematics unit regarding whether expedited emergency procedures should be used. In another implementation, the telematics unit may transmit whether the TIM and TTY device are operational, and the call center may determine whether or not expedited emergency procedures should be used based on that information. It will be appreciated that the notification of the detection of an emergency and transmittal of information regarding whether expedited emergency procedures should be used may occur simultaneously or may be represented by a single message.

If the call center determines that expedited emergency procedures should be used 403 (e.g. where the subscriber is deaf and/or mute; or where the subscriber is deaf and/or mute and the TIM or TTY device is not available), the call center may immediately contact a PSAP 417. On the other hand, if the call center determines that expedited emergency procedures should not be used 403, the call center may further communicate with the subscriber—either vocally 407 if the subscriber is not deaf and/or mute 405, or through the TTY device 409 if the subscriber is deaf and/or mute 405—to determine whether contacting PSAP is necessary based on the subscriber's emergency situation 411. Accordingly, if determined to be necessary based on the communications, the call center will contact the PSAP 413, and if determined to be not necessary based on the communications, the call center will not contact the PSAP 415. It will be appreciated that a determination of whether the subscriber is deaf and/or mute may occur at the call center or at the telematics unit, and may occur at any time (not necessarily at the times depicted by FIGS. 3 and 4) based on how the described process is implemented.

Although the term "deaf and/or mute" are used throughout this application, it will be appreciated that the principles described herein may apply to individuals who are not necessarily deaf and/or mute as ordinarily understood, but who may nonetheless require the use of a TTY device to communicate with an operator at the call center (e.g. individuals with varying degrees of "deafness" and/or "muteness").

It will thus be appreciated that the described system allows for determining whether to immediately contact a PSAP or attempt to communicate with a subscriber before contacting the PSAP in the event of a detected emergency. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for handling an emergency for a telematics-equipped vehicle, the method comprising:
   determining, at a telematics unit, that an emergency has occurred;
   detecting whether a TeleTYpewriter (TTY) device and a TTY Interface Module (TIM) are operational;
   in response to detecting that at least one of the TTY device and the TIM is not operational, transmitting an indication to a call center that an expedited emergency procedure is to be used so as to cause the call center to contact a Public Safety Answering Point (PSAP); and
   in response to detecting that the TTY device and the TIM are both operational, establishing a communication session between the telematics unit and the call center wherein a user of the telematics unit communicates with the call center via the TTY device and the TIM according to a normal emergency procedure.

2. The method of claim 1, wherein determining that an emergency has occurred further comprises at least one of:
   receiving an input from the subscriber indicating that an emergency has occurred;
   receiving information that the vehicle was in an accident; and
   receiving information that the vehicle airbag was deployed.

3. The method of claim 1, further comprising:
   in response to detecting that at least one of the TTY device and the TIM is not operational, before transmitting the indication to the call center that the expedited emergency procedure is to be used, determining that a subscriber associated with the telematics unit is at least one of deaf and mute.

4. A system comprising a telematics unit part of a telematics-equipped vehicle, wherein the telematics unit includes a tangible, non-transient computer-readable medium having thereon computer executable instructions for handling an emergency for the vehicle, the computer executable instructions comprising instructions for:
   determining that an emergency has occurred;
   detecting whether a TeleTYpewriter (TTY) device and a TTY Interface Module (TIM) are operational;
   in response to detecting that at least one of the TTY device and the TIM is not operational, transmitting an indication to a call center that an expedited emergency procedure is to be used so as to cause the call center to contact a Public Safety Answering Point (PSAP); and
   in response to detecting that the TTY device and the TIM are operational, establishing a communication session between the telematics unit and the call center wherein a user of the telematics unit communicates with the call center via the TTY device and the TIM according to a normal emergency procedure.

5. The system of claim 4, wherein the instructions for determining that an emergency has occurred further comprises at least one of:
   instructions for receiving an input from the subscriber indicating that an emergency has occurred;
   instructions for receiving information that the vehicle was in an accident; and
   instructions for receiving information that the vehicle airbag was deployed.

6. The system of claim 4, wherein information relating to whether a subscriber associated with the telematics unit is at least one of deaf and mute is stored on the computer-readable medium.

7. The system of claim 4, wherein the computer-executable instructions further comprise instructions for:
   in response to detecting that at least one of the TTY device and the TIM is not operational, before transmitting the indication to the call center that the expedited emergency procedure is to be used, determining that a subscriber associated with the telematics unit is at least one of deaf and mute.

* * * * *

UNITED STATES PATENT AND TRADEMARK OFFICE
CERTIFICATE OF CORRECTION

PATENT NO. : 8,588,731 B2  Page 1 of 1
APPLICATION NO. : 13/181190
DATED : November 19, 2013
INVENTOR(S) : Jacquelyn A. Gouvia et al.

It is certified that error appears in the above-identified patent and that said Letters Patent is hereby corrected as shown below:

On the title page, item (54) and in the specification, col. 1, the title of the invention "TYY Interface Module Signal to Communicate Equipment Disruption to Call Center"
should read --TTY Interface Module Signal to Communicate Equipment Disruption to Call Center--

Signed and Sealed this
Twelfth Day of May, 2015

Michelle K. Lee
*Director of the United States Patent and Trademark Office*